Feb. 9, 1937.　　　G. A. UNGAR　　　2,070,386
CUTTING APPARATUS
Filed Sept. 6, 1935　　　4 Sheets-Sheet 1
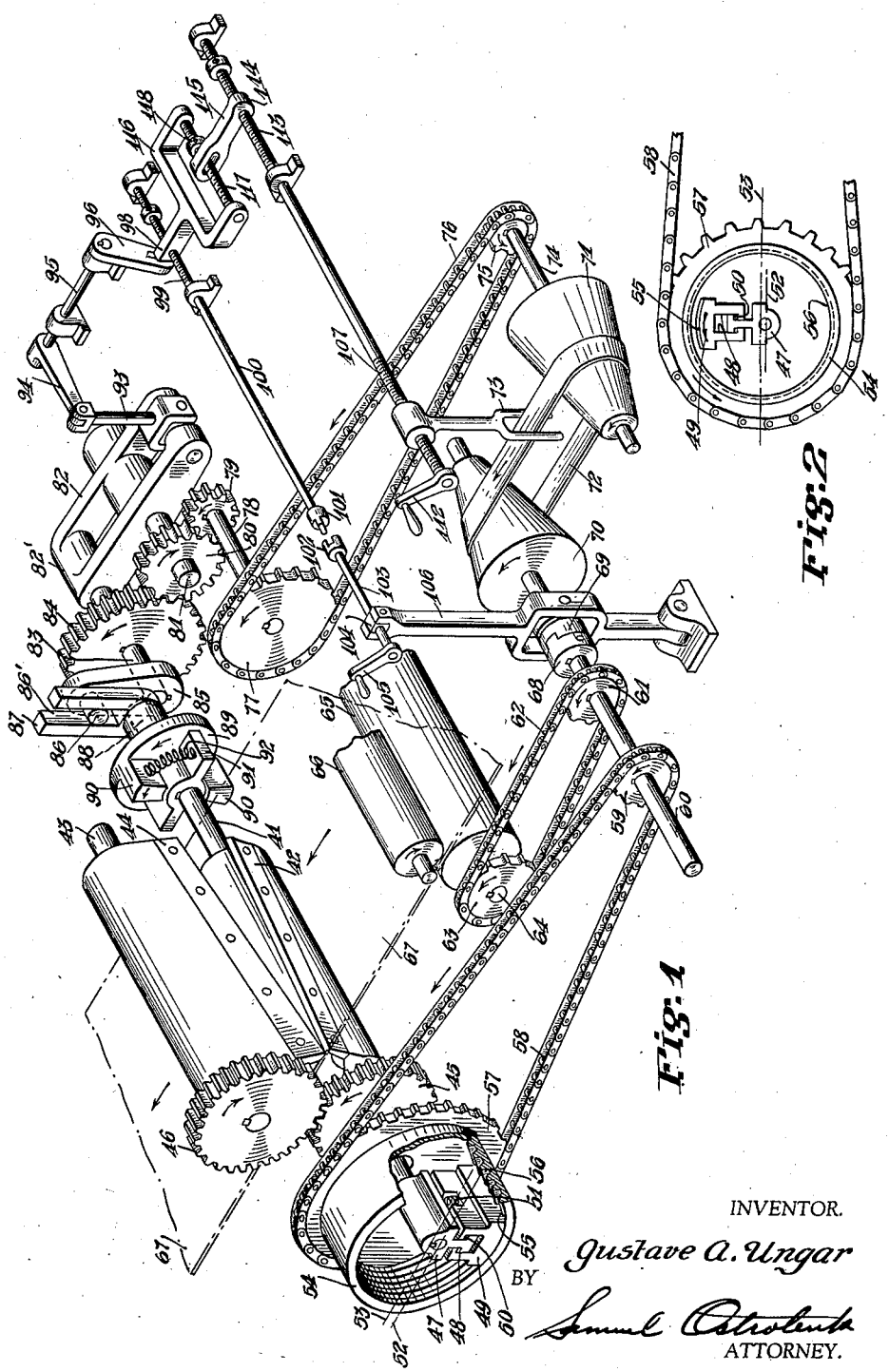
INVENTOR.
Gustave A. Ungar
BY
Samuel Ostrolenk
ATTORNEY.

Feb. 9, 1937.  G. A. UNGAR  2,070,386
CUTTING APPARATUS
Filed Sept. 6, 1935   4 Sheets-Sheet 2
Fig. 6
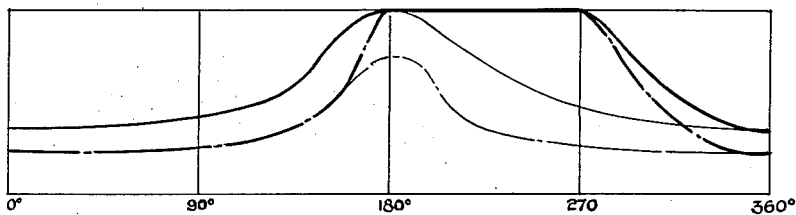
Fig. 7
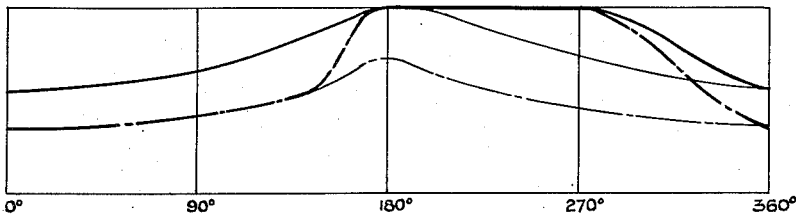
Fig. 8
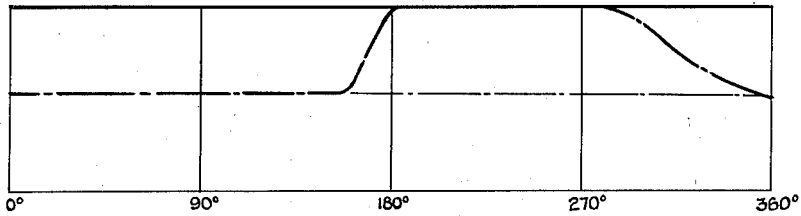
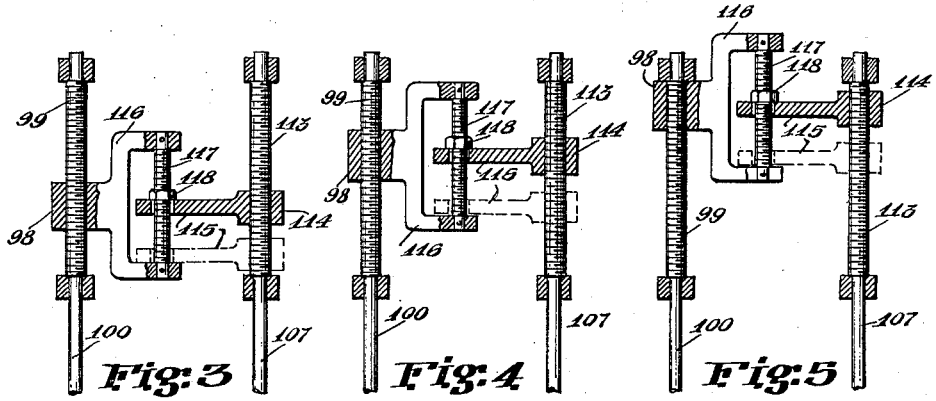
Fig. 3   Fig. 4   Fig. 5
INVENTOR.
Gustave A. Ungar
BY
Samuel Ostrolenk
ATTORNEY.

Feb. 9, 1937.  G. A. UNGAR  2,070,386
CUTTING APPARATUS
Filed Sept. 6, 1935  4 Sheets-Sheet 3

INVENTOR.
Gustave A. Ungar
BY
ATTORNEY.

Feb. 9, 1937.  G. A. UNGAR  2,070,386
CUTTING APPARATUS
Filed Sept. 6, 1935  4 Sheets-Sheet 4

INVENTOR.
Gustave A. Ungar
BY
Samuel Ostrolenk
ATTORNEY.

Patented Feb. 9, 1937

2,070,386

UNITED STATES PATENT OFFICE 2,070,386

CUTTING APPARATUS

Gustave A. Ungar, Pelham Manor, N. Y., assignor to S. & S. Corrugated Paper Machinery Co., Inc., Brooklyn, N. Y., a corporation of New York Application September 6, 1935, Serial No. 39,397

22 Claims. (Cl. 164—68)

My invention relates to novel cutting apparatus and more particularly relates to novel apparatus for cutting wire and sheet material such as sheet metal, paper, corrugated boards, etc.

The purpose of this invention is the cutting of predetermined lengths of such sheet material or wire while this material is fed at a uniform rate of speed through the machine.

In order to obtain a clean cut and to prevent buckling or tearing of the material to be cut, the component of the moving cutting tool in the direction of the travelling material must be equal to the travelling speed of the material during the entire period of the cut.

The period of the cut, in order to avoid excessive shearing loads and shocks, should be spread over as long a time as possible. Helical knives or modified flat knives as shown in my co-pending application Serial No. 36,519, filed August 16, 1935, can be used to increase the time of the cutting period.

In order to accomplish this, I drive the cutting mechanism during a definite part of each revolution by positive connection with the mechanism feeding the material into the apparatus. During the remaining portion of each revolution the cutting mechanism is operated by a suitable timing mechanism which can be changed to vary the number of cut-offs per minute.

With such a device it is possible to utilize comparatively weak timing impulses accurately and powerfully.

In the case of the cut-off mechanism to be described at greater length, the pick-up mechanism makes available ample power of uniform speed at the cutting period and frees the timing mechanism from the cumbersome power drive.

Two types of mechanisms are shown for the intermittent picking up of the shearing mechanism which has been suitably tuned by the drive mechanism. The drive mechanism operates continuously at the constant speed of the material to be cut and is capable of supplying all power required for shearing.

In each case the mechanism amplifies impulses received from a timing mechanism during a definite portion of each revolution. The amplification can be obtained.

(a) By amplifying the torque available from the timing mechanism to the full extent of the constant speed power drive;

(b) By increasing the speed from that of the timing mechanism to that of the power drive;

(c) By amplifying torque and increasing speed.

In the two arrangements described the shearing mechanism, while driven by the pick-up is permitted to run away from the slower moving timing device. After the power feed mechanism has ceased to drive the shearing mechanism, the timing mechanism, by means of suitable equalizing springs slows up the shearing mechanism until the timing device catches up with it and then accurately times it for the next cut-off period.

Accordingly, an object of my invention is to provide a novel cutting mechanism for sheet material.

A further object of my invention is to provide a novel cutting mechanism in which the knives are invariably driven at the same speed as the sheet material being cut during the cutting interval.

Still another object of my invention is to provide novel apparatus whereby relatively weak timing impulses are utilized for controlling the synchronous operation of the cutting mechanism during the cutting interval.

Still a further object of my invention is to provide a novel pickup mechanism for controlling the operation of the cut-off mechanism during the cutting interval.

There are other objects of my invention which, together with the foregoing, will appear in the detailed description of the invention which is to follow in connection with the drawings, in which:

Figure 1 is a perspective schematic illustration of one form of my invention.

Figure 2 is a fragmentary side elevation of driving sector in a disengaged position.

Figures 3, 4 and 5 are details of parts of the timing mechanism illustrating three positions thereof for obtaining three different ranges of cuts of the material.

Figures 6 to 8 are graphic illustrations of the speeds of the cutting mechanism during a cycle for different conditions.

Figure 9:
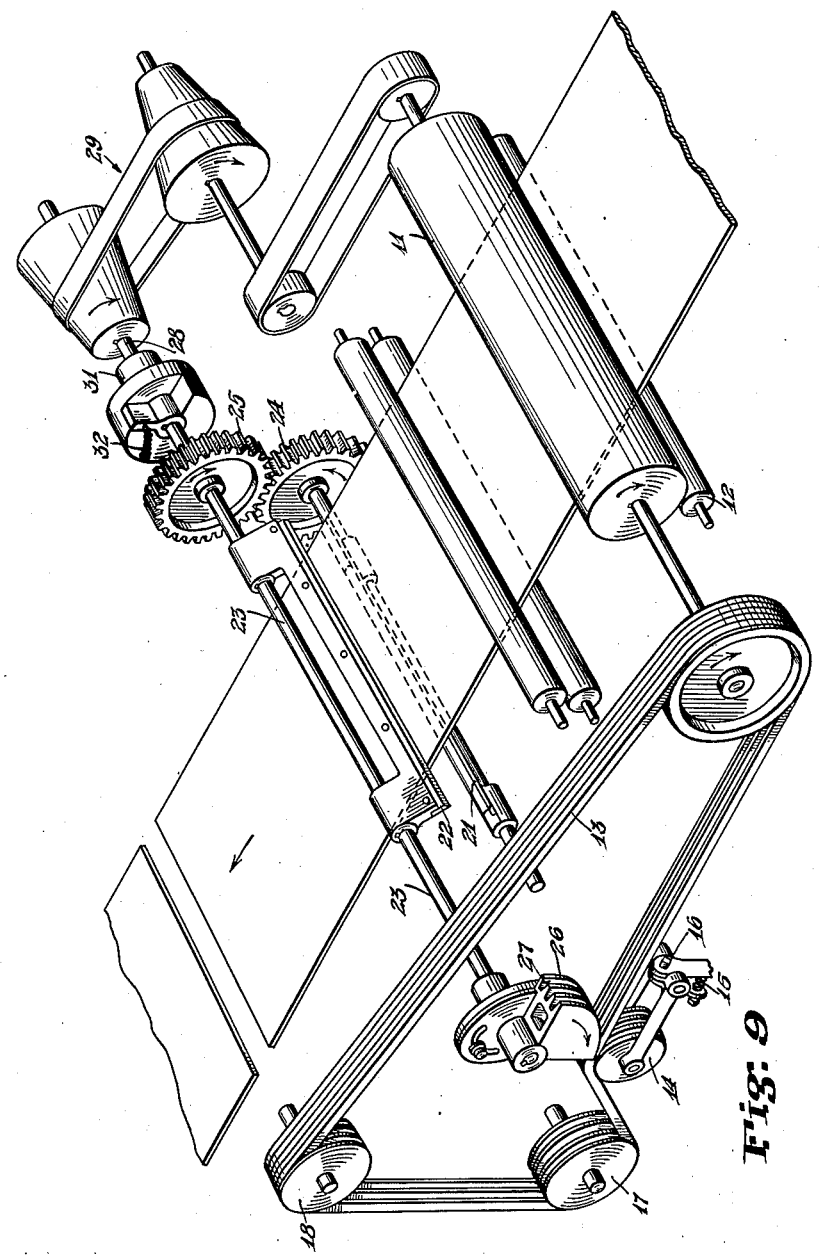
Figure 9 is a schematic perspective of another form of my invention.

Referring to Figure 9, the feeding roll 11 which feeds the sheets by means of spring loaded press rolls 12 is operated by means of multiple V-belts 13. These V-belts 13 travel around an idler pulley 14 which is\pressed against the V-belts by spring 15 and prevented from excessive movement by stop 16. The V-belts 13 also travel around sheaves 17 and 18, one of which may be operated from the main drive of the machine.

The cutting knives 21 and 22 are of the revolving type. The upper knife 22 is mounted on the drive shaft 23 and the shafts of both knives are held in correctly timed relation by means of gears 24 and 25.

On one end of shaft 23 is keyed a sector 26 which is provided with V-grooves 27 suitable to engage with the V-belts 13.

At the other end of shaft 23 is the speed equalizing mechanism also employed in the other form of my invention.

In its basic form, this speed equalizing mechanism is mounted on shafts 28 and 23. Shaft 28 is timed from a variable speed mechanism, such as a Reeves speeder diagrammatically indicated by 29.

As long as sector 26 is not in engagement with the V-belts 13, shaft 23 is positively driven and timed from shaft 28 by means of a suitable driving lug 31. As soon as the leading edge of sector 26 touches the V-belts 13, these two moving parts, travelling in the same direction, draw into positive engagement with each other owing to their joint wedging action. Shaft 23 is accelerated to the velocity of the material and the shearing can take place without any drag or crowding.

While this takes place, shaft 23 revolves faster than shaft 28. Spring 32 is expanded and stores up energy. As soon as sector 26 has travelled through a fixed arc (about 120°), it is no longer driven by the V-belts 13 and the action of spring 32 retards shaft 23 until shaft 28 has caught up with it and again drives it through lug 31 and thereby times it accurately. A suitable brake is provided to prevent a too rapid approach of the two shafts when under the influence of spring 32. This brake is, of course, not effective when shaft 23 runs ahead of shaft 28.

The length of the sheets to be cut is varied by merely changing the R. P. M. of shaft 28 and this is done while the machine is in motion. No adjustment is required nor necessary for the cutting in and out of the pickup mechanism, i. e., the sector 26 and its V-belts 13. The points of engagement and driving interval in the cutting cycle of the revolving shears remain always the same regardless of the length of the cut.

Since the acceleration and power requirements for a certain sheet length remain unchanged for every cut, and since the pick-up goes into effect at exactly the same point of the cycle, the sheet length will remain uniform within very close limits after the correct length has been adjusted with the machine running, by operating the cut-off timing speeder at the proper speed.

For very high sheet speeds, for instance 300 ft. per minute, an auxiliary attachment is provided to reduce the acceleration forces to bring the sector 26 from the lower timing speed to the higher cutting speed. This arrangement is diagrammatically shown in Figures 10 and 11.

Alongside of sector 26 is mounted axially movable, the auxiliary friction sector 33. Idler 34 for the V-belts is provided with two friction pulleys 35 and 36 of successively smaller diameters.

Friction sector 33 consists of two steps 37 and 38 of successively larger diameters.

These steps can be brought into operating position with friction pulleys 35 and 36 respectively by axially shifting them only when the machine is at rest and neither 26, 37 nor 38 are in frictional engagement, since otherwise the mechanism would be damaged while the shift is made.

Figure 10:
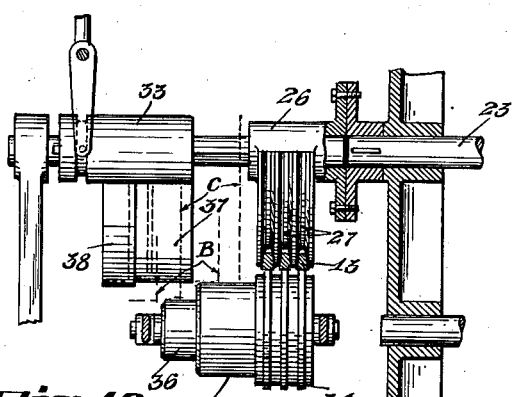
Figures 10 to 11 are details of an accelerating mechanism for the mechanism illustrated in Figure 9.
Figure 11:
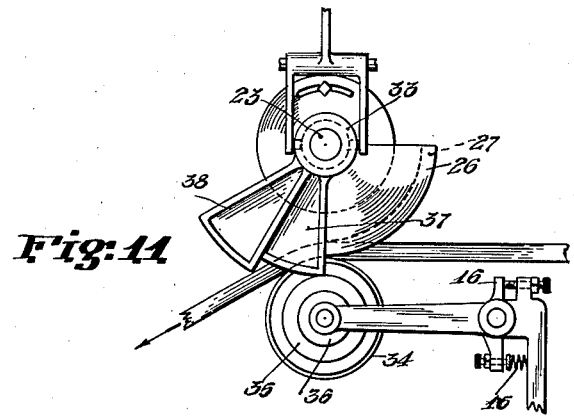

The position of auxiliary sector 33 shown in Figure 10 is for short sheets. Here the acceleration from timing to cutting speed is comparatively slight and no excessive stresses are imposed on the driving mechanism.

For medium sheet length, the auxiliary sector 33 is put into position B (dotted lines Figure 10). Friction sector 37 first comes into contact with pulley 35 and is given an intermediate acceleration so that the final acceleration when the grooved sector 26 is picked up by the V-belts is considerably reduced.

For the longest sheets, the auxiliary sector 33 is moved into position C—Figure 10. Friction sector 38 by contact with pulley 36 produces an initial acceleration; sector 37 then accelerates by contact with 35 and finally the grooved sector 26 is picked up by the V-belts.

The acceleration of the shearing mechanism is thereby divided into three stages with consequent substantial reduction of driving stresses.

The second embodiment of my invention is shown in isometric perspective view in Figure 1.

The principal difference from the first alternative consists in the method of picking up the knife shaft by means of the feeding mechanism and in a different method of speeding up the knife shaft prior to its being driven by the pick-up mechanism.

The driving knife shaft 41 with its knife 42 and the driven knife shaft 43 with its knife 44 are kept in timed relation by means of gears 45 and 46.

Keyed onto shaft 41 is driving hub 47 which carries on guiding surfaces 48 an axially slidable drive sector 49. Shoulders 50 prevent sector 49 from moving beyond a predetermined position. Compression springs 51 keep sector 49 pressed outwardly. The axis of rotation 52 of the knife shaft is eccentric to axis 53 of driving drum 54.

Drive sector 49 is provided with a series of circular V-shaped grooves 55 which are capable of frictional engagement with corresponding V-grooves 56 of drum 54.

Drum 54 is continually driven at constant speed by sprocket 57, chain 58 and main drive sprocket 59, which is mounted on main drive shaft 60. Keyed to 60 is also sprocket 61, which, through chain 62 and sprocket 63, drives feed roll shaft 64 and through it feed roll 65. Roll 65 and the spring loaded roll 66 (spring not shown), in contact with sheet 67 feed the sheet into the cutting mechanism. A positive and constant speed relation therefore exists between the speed of the sheet and the speed of drum 54.

Owing to the eccentric position of axes 52 and 53, sector 49 is out of engagement with drum 54 during about one half a revolution, but is in positive driving engagement with 54 during the balance of each revolution. Sector 49 on shaft 41 is driven by the timing mechanism in the same direction as drum 54, at a lower speed. After sector 49 has passed through the horizontal position the V-grooves 55 and 56 come into frictional engagement as springs 51 are compressed. The frictional engagement between sector and drum is facilitated by the fact that both parts move in the same direction and readily wedge together since the angle of engagement, owing to the slight eccentricity of the two, is very small. This frictional engagement is, therefore, very positive and not dependent upon the functioning of levers, cams, rollers, etc. It is accomplished by the mutual cooperation of both members operating in the same direction and providing their own engaging pressure merely by the eccentric location of the two axes. The frictional surface pressure can be readily controlled by providing any desired number of V-grooves and by changing the pressure of spring 51.

This pick-up design can be built totally enclosed and with lubricated friction surfaces. It lends itself, therefore, particularly to heavy duty and continuous operation.

The timing of knife shaft 41 to produce the desired sheet length is obtained through a variable speed mechanism. This is diagrammatically indicated as follows: Connected to main drive shaft 60 by means of a manually operable jaw clutch 68, 69, is taper pulley 70 which drives taper pulley 71 by means of belt 72. Belt 72 can be shifted by shifter 73. In the position shown the driven pulley 71 operates at its medium speed.

Pulley 71 is keyed to shaft 74 and through sprocket 75 and chain 76 it drives sprocket 77 which in turn is mounted on shaft 78. Shaft 78 carries pinion 79 which is in mesh with idler gear 80. Idler gear 80 is free to turn on shaft 81 which also forms the fulcrum for lever 82. Lever 82 has mounted at its left end in bearing 82' the crankshaft 83, to which is keyed gear 84, which is driven by gear 80. Shaft 83 has keyed to it crank 85 with crankpin roller 86. Roller 86 can slide in the track 86' of crank 87, which in turn is keyed to shaft 88.

Shaft 88 carries equalizer drive coupling 89. Lugs 90 of this coupling serve to drive and time the driven coupling 91, which is keyed to knife shaft 41, when sector 49 and drum 54 are not in engagement. In the position shown 49 and 54 are not in engagement and shaft 41 with coupling 91 is in advance of shaft 88 with coupling 89. This advance movement compresses springs 92, storing up energy, which becomes available to bring the coupling lugs 90 back into driving and timing engagement. A brake mechanism (not shown) similar to that described with the first type serves to avoid clashing between lugs 90 and 91. Shaft 83 is shown to be eccentric to shaft 88. The relative position of these shaft centers changes the angular velocity of driven shaft 88. This mechanism is therefore a speed variator. The greater the eccentricity, the more the variation of the angular velocity during each revolution.

The pitch diameter of the revolving knives is chosen so that its circumference is equal to the shortest sheet to be cut; therefore the knife shaft can revolve at uniform speed when cutting the shortest sheets and the centers of shafts 83 and 88 can remain concentric. In order to increase the length of sheets the output speed of the speed change unit is reduced.

If the output speed is, for instance, reduced to one half the speed for shortest sheet length, then the sheet length is doubled and in this case the speed of shaft 41 has to be brought up to twice the timing speed while sector 49 is in engagement with drum 54.

To avoid excessive accelerations with very high sheet velocities (say 300 ft. per minute), the speed variator is employed.

In order to be able to shift the relative center position of shafts 83 and 88 it is necessary to disconnect its drive mechanism from the main drive shaft, so as to prevent jamming or breaking of some of the moving parts. This is due to the fact that the shift in centers produces a change in the angular relation of cranks 85 and 87. Unless the drive to shaft 83 is disconnected, this angular change cannot be undertaken.

In order to prevent any attempt to shift the centers of shafts 83 and 88 while the mechanism is driven and therefore running, the following safety feature is employed to prevent damage to the machine.

Lever 82 is movable up and down by means of link 93 and lever 94. Lever 94 is keyed to shaft 95 which carries also lever 96. Lever 96 carries in a radial slot the nut 98. Threads 99 of shaft 100 engage with the nut. Shaft 100 carries jaw coupling half 101. This entire mechanism is enclosed in a housing and is not accessible to the operator. The coupling half 102 is mounted on shaft 103 which has fastened to it collar 104 and handle 105. Collar 104 is shifted axially by the action of the clutch lever 106 which operates the jaw clutch 68—69. With jaw clutch 68—69 engaged, lever 106 keeps clutch jaws 102 and 101 disengaged and it is therefore impossible to adjust shaft centers of shafts 83 and 88 while the timing mechanism is driven and moving and therefore all possible damage to the mechanism is prevented.

As soon as clutch 68—69 is disengaged, the timing mechanism stops and quick adjustment of centers of shafts 83 and 88 is possible. As soon as the clutch 68—69 is reengaged, clutch 101—102 is immediately disengaged, thereby blocking adjustment of the variator, while the timing shaft is running.

In the arrangement shown, the total range of the sheet lengths is arbitrarily divided into three groups, each group being handled with one definite adjustment of the variator.

This provision is made particularly for operation of the machine at maximum speed: A suitable interlock is provided between the adjustment of the speed change mechanism (70, 71, 72) and the variator adjustment. For this purpose the belt shifter 73 is actuated through screw shaft 107 which is operated by handle 112. Shaft 107 is provided with screw threads 113 which engage nut 114 with its extension 115.

This extension 115 is limited in its travel by the position of fork 116 which is part of variator shifting nut 98. Threaded rod 117 with adjustable stop nut 118 determines the extent of travel of 115.

As explained before the sheet length adjustment is arbitrarily divided into three groups.

Adjustment I (see also velocity-angle diagram), Fig. 6, covers maximum sheet length to three-quarters of maximum sheet length.

With the variator adjustment in the position shown in Figure 3 and Figure 6, the speed change device (speeder) can be adjusted from maximum sheet length to three-quarters of maximum sheet length while the machine is running.

This variator adjustment with the speeder running for three-quarters of maximum sheet length brings the knife shaft 41 up to the sheet speed, so that the engagement of sector 49 and drum 54 takes place with no acceleration. The diagram, Figure 6, shows the knife shaft speed in heavy full lines and also indicates how the knife velocity is constant while cutting takes place since sector 49 is driven by drum 54. The velocity of the variator driven shaft 88 during the engagement of 49 with 54 is indicated in light full lines.

If the speeder is now adjusted to the maximum sheet length, (115 in dotted lines Figure 3) i. e., when its speed is reduced to the minimum, the velocities of the driven variator shaft 88 are reduced in proportion. The diagram, Figure 6, shows these velocities in dash-dot lines. The knife shaft velocities are in heavy lines and the variator velocities with 49 and 54 engaged in light lines. The diagram shows the extent to which the knife shaft has to be accelerated by the action of the pick-up, so as to reach the sheet speed.

In order to cut sheets shorter than three-quarters of maximum sheet length, the variator is put into the position shown in Figure 4 and Figure 7 which arbitrarily takes care of sheets from three-quarters to one-half maximum sheet length.

With the adjustment of Figure 3 the speeder cannot be reduced in speed to go below three-quarters of maximum sheet length, since extension 115 (in full lines Figure 3) is stopped by nut 118. The speeder clutch 68—69 is therefore thrown out, clutch 101—102 engaged and the variator centers are adjusted until fork 116 comes to a stop at extension 115 (in dotted lines Figure 4).

Clutch 68—69 is reengaged and the machine, without stopping can now be adjusted to cut sheets from three-quarters to one-half maximum sheet length.

With variator adjustment shown in Fig. 4 and the speeder set for one-half of maximum sheet length the variator driven shaft 88 is brought up to sheet speed and when sector 49 engages with drum 54, there is no further acceleration necessary for knife shaft 41, which the variator has brought up to revolve at sheet speed as shown in heavy full lines on velocity angle diagram—Figure 7; the thin solid line shows the velocity of the driven variator shaft while sector 49 is driven by drum 54.

If the speeder is set for three-quarters sheet length with the adjustment of Figure 7, then the variator speed drops in proportion and when the sector 49 engages with drum 54 the knife shaft has to be accelerated. The knife shaft velocities are shown in heavy dash-dotted lines while the velocities of the variator driven shaft when 49 and 54 are in engagement are shown in light dash-dotted lines.

Adjustment as shown in Figure 5 and Figure 8 of the variator is made after the sheet length has been reduced to one-half of maximum sheet length with adjustment as shown in Figure 4 and Figure 7. Clutch 68—69 is thrown out and the variator is adjusted into position as shown in Figure 5, i. e., until fork 116 strikes nut extension 115 (shown in dotted lines in Fig. 5).

The two shafts 83 and 88 are then concentric and for minimum sheet length (one-quarter of maximum) the velocity of the variator driven shaft which is now uniform, equals that of shaft 41 when sector 49 engages with drum 54.

If the speed of the speeder is reduced so as to reach one-half the maximum sheet length, the velocity of the variator driven shaft is also reduced and the knife shaft 41 has to be accelerated to the sheet speed as shown in dash-dotted heavy lines on Figure 8. The velocity of the variator driven shaft with 49 and 54 in engagement is shown in light dash-dotted lines.

For the above variator adjustments, the velocity conditions for corrugated cardboard cutting machines, for instance, may be as follows:

| | Inches |
|---|---|
| Minimum sheet length | 30 |
| Maximum sheet length | 120 |
| Knife bar pitch diameter | 9.5 |

With a sheet speed of 300 feet per minute, the cutting speed will correspond to 120 R. P. M. knife speed and the lengths will vary from 90 inches to 120 inches.

Variator adjustment—Figure 3 and Figure 6:
90 inch sheets require no further acceleration of sector 49 by drum 54;

$$\text{Timing} = \frac{300 \times 12}{90} = 40 \text{ R. P. M.};$$

variator increases velocity to 120 R. P. M.
For 120 inch sheets the timing will be—

$$\frac{300 \times 12}{120} = 30 \text{ R. P. M.};$$

variator increases velocity to 90 R. P. M.
Speed increase of sector 49 is therefore 90 to 120 R. P. M. or 30 R. P. M.

Variator adjustment—Figure 4 and Figure 7:
This will be used for sheets from 60 inches to 90 inches and the maximum sheet speed will be 250 feet per minute corresponding to 100 R. P. M. knife shaft speed.

For 60 inch sheets, the timing will be—

$$\frac{250 \times 12}{60} = 50 \text{ R. P. M.}$$

The variator increases the velocity to 100 R. P. M. so that no further acceleration of the knife shaft is necessary when sector 49 engages with drum 54.
For 90 inch sheets the timing will be—

$$\frac{250 \times 12}{90} = 33.3 \text{ R. P. M.}$$

The variator increases the velocity to 66.7 R. P. M. so that the maximum pick-up speed increase of sector 49 is 33.3 R. P. M.

Variator adjustment—Figure 5 and Figure 8:
This will be used for sheets from 30 inches to 60 inches and the maximum sheet speed will be 150 ft. per minute, corresponding to 60 R. P. M. knife shaft speed.

For 30 inch sheets the timing will be—

$$\frac{150 \times 12}{30} = 60 \text{ R. P. M.}$$

The variator does not change the velocity and there is no acceleration necessary.

Since the variator does not increase the speed, the maximum speed increase of sector 49 will be 30 R. P. M.

It will be seen from the above that with these three variator adjustments the maximum increase in knife shaft R. P. M. even at the highest sheet speeds is limited to 33.3 R. P. M.

Although in the above, I have described preferred embodiments of my invention, it will be understood that they may take other forms and I do not intend to be limited by these illustrations except as set forth in the appended claims.

I claim:
1. In a device for cutting sheets from continuous webs, a source of power; a first drive means controlled from said source of power for feeding said web at a substantially constant rate of speed; knife cutting means operating through a cycle, each cycle including a cutting interval during which the knife means engage and cut said web; a second variable speed drive means controlled from said source of power for driving said knife means; a third constant speed drive means controlled from said source of power and operative only during the cutting interval of said knife means for driving said knife means at the constant speed of said web; and spring means interposed between said second drive means and said source of power for permitting said knife means to be driven from said third drive means free from said second drive means.

2. In a device for cutting sheets from continuous webs, a source of power; a first drive means controlled from said source of power for feeding said web at a substantially constant rate of speed; knife cutting means operating through a cycle, each cycle including a cutting interval during which the knife means engage and cut said web; a second variable speed drive means controlled from said source of power for driving said knife means; a third constant speed drive means controlled from said source of power and operative only during the cutting interval of said knife means for driving said knife means at the constant speed of said web; and adjusting means interposed between said source of power and said second drive for changing the rate of acceleration and deceleration of said second drive means.

3. In a device for cutting sheets from continuous webs, a source of power; a first drive means controlled from said source of power for feeding said web at a substantially constant rate of speed; knife cutting means operating through a cycle, each cycle including a cutting interval during which the knife means engage and cut said web; a second variable speed drive means controlled from said source of power for driving said knife means; a third constant speed drive means controlled from said source of power and operative only during the cutting interval of said knife means for driving said knife means at the constant speed of said web; spring means interposed between said second drive means and said source of power for permitting said knife means to be driven from said third drive means free from said second drive means; and adjusting means interposed between said source of power and said second drive means for changing the rate of acceleration and deceleration of said second drive means.

4. In a device for cutting sheets from continuous webs, a source of power; a first drive means controlled from said source of power for feeding said web at a substantially constant rate of speed; knife cutting means operating through a cycle, each cycle including a cutting interval during which the knife means engage and cut said web; a second variable speed drive means controlled from said source of power for driving said knife means; a third constant speed drive means controlled from said source of power and operative only during the cutting interval of said knife means for driving said knife means at the constant speed of said web; adjusting means interposed between said source of power and said second drive means for changing the rate of acceleration and deceleration of said second drive means; and means whereby said third drive means is disconnected from said source of power when said adjusting means is operated.

5. In a device for cutting sheets from continuous webs, a source of power; a first drive means controlled from said source of power for feeding said web at a substantially constant rate of speed; knife cutting means operating through a cycle, each cycle including a cutting interval during which the knife means engage and cut said web; a second variable speed drive means controlled from said source of power for driving said knife means; a third constant speed drive means controlled from said source of power and operative only during the cutting interval of said knife means for driving said knife means at the constant speed of said web; spring means interposed between said second drive means and said source of power for permitting said knife means to be driven from said third drive means free from said second drive means; adjusting means interposed between said source of power and said second drive means for changing the rate of acceleration and deceleration of said second drive means; and means whereby said third drive means is disconnected from said source of power when said adjusting means is operated.

6. In a device for cutting sheets from continuous webs, a source of power; a first drive means controlled from said source of power for feeding said web at a substantially constant rate of speed; knife cutting means operating through a cycle, each cycle including a cutting interval during which the knife cutting means engage and cut said web; a second variable speed drive means controlled from said source of power for driving said knife means, said second drive means comprising a fork connected to said knife means and a rotating arm pin slidably mounted in said fork and connected to said source of power for accelerating and decelerating said fork in each cycle of rotation of said arm; and a third constant speed drive means controlled from said source of power and operative only during the cutting interval of said knife means for driving said knife means at the constant speed of said web.

7. In a device for cutting sheets from continuous webs a source of power; a first drive means controlled from said source of power for feeding said web at a substantially constant rate of speed; knife cutting means operating through a cycle, each cycle including a cutting interval during which the knife means engage and cut said web; a second variable speed drive means controlled from said source of power for driving said knife means, said second drive means comprising a plurality of independent members each accelerating said knife means through a predetermined range; and a third constant speed drive means controlled from said source of power and operative only during the cutting interval of said knife means for driving said knife means at the constant speed of said web.

8. In a device for cutting sheets from continuous webs, a source of power; a first drive means controlled from said source of power for feeding said web at a substantially constant rate of speed; knife cutting means operating through a cycle, each cycle including a cutting interval during which the knife cutting means engage and cut said web; a second variable speed drive means controlled from said source of power for driving said knife means, said second drive means comprising a fork connected to said knife means and a rotating arm pin slidably mounted in said fork and connected to said source of power for accelerating and decelerating said fork in each cycle of rotation of said arm; a third constant speed drive means controlled from said source of power and operative only during the cutting interval of said knife means for driving said knife means at the constant speed of said web; and adjusting means interposed between said source of power and said second drive means for changing the rate of acceleration and deceleration of said second drive means.

9. In a device for cutting sheets from continuous webs, a source of power; a first drive means controlled from said source of power for feeding said web at a substantially constant rate of speed; knife cutting means operating through a cycle, each cycle including a cutting interval during which the knife means engage and cut said web; a second variable speed drive means controlled from said source of power for driving said knife means, said second drive means comprising a plurality of independent members each accelerating said knife means through a predetermined range; a third constant speed drive means controlled from said source of power and operative only during the cutting interval of said knife means for driving said knife means at the constant speed of said web; and adjusting means interposed between said source of power and said second drive means for changing the rate of acceleration and deceleration of said second drive means.

10. In a device for cutting sheets from continuous webs, a source of power; a first drive means controlled from said source of power for feeding said web at a substantially constant rate of speed; knife cutting means operating through a cycle, each cycle including a cutting interval during which the knife means engage and cut said web; a second variable speed drive means controlled from said source of power for driving said knife means; and a third constant speed drive means comprising a positive drive and controlled from said source of power for driving said knife cutting means during the cutting interval of said knife means.

11. In a device for cutting sheets from continuous webs, a source of power; a first drive means controlled from said source of power for feeding said web at a substantially constant rate of speed; knife cutting means operating through a cycle, each cycle including a cutting interval during which the knife means engage and cut said web; a second variable speed drive means controlled from said source of power for driving said knife means; and a third constant speed drive means comprising a cammed member driven from said source of power and a sector connected to said knife means periodically engaged at a predetermined angular position of said cammed member for driving said knife means from said source of power.

12. In a device for cutting sheets from continuous webs, a source of power; a first drive means controlled from said source of power for feeding said web at a substantially constant rate of speed; knife cutting means operating through a cycle, each cycle including a cutting interval during which the knife means engage and cut said web; a second variable speed drive means controlled from said source of power for driving said knife means; a third constant speed drive means having a portion thereof connected to said knife means and another portion to said source of power, said portions being operatively disconnected over a predetermined portion of the cycle and invariably engaging during the cutting interval of said knife cutting means for transmitting power from said source of power to said knife cutting means; and spring means interposed between said second drive means and said source of power for permitting said knife means to be driven from said third drive means free from said second drive means.

13. In a device for cutting sheets from continuous webs, a source of power; a first drive means controlled from said source of power for feeding said web at a substantially constant rate of speed; knife cutting means operating through a cycle, each cycle including a cutting interval during which the knife means engage and cut said web; a second variable speed drive means controlled from said source of power for driving said knife means; a third constant speed drive means having a portion thereof connected to said knife means and another portion to said source of power, said portions being operatively disconnected over a predetermined portion of the cycle and invariably engaging during the cutting interval of said knife cutting means for transmitting power from said source of power to said knife cutting means; and adjusting means interposed between said source of power and said second drive means for changing the rate of acceleration and deceleration of said second drive means.

14. In a device for cutting sheets from continuous webs, a source of power; a first drive means controlled from said source of power for feeding said web at a substantially constant rate of speed; knife cutting means operating through a cycle, each cycle including a cutting interval during which the knife means engage and cut said web; a second variable speed drive means controlled from said source of power for driving said knife means; a third constant speed drive means having a portion thereof connected to said knife means and another portion to said source of power, said portions being operatively disconnected over a predetermined portion of the cycle and invariably engaging during the cutting interval of said knife cutting means for transmitting power from said source of power to said knife cutting means; spring means interposed between said second drive means and said source of power for permitting said knife means to be driven from said third drive means free from said second drive means; and adjusting means interposed between said source of power and said second drive means for changing the rate of acceleration and deceleration of said second drive means.

15. In a device for cutting sheets from continuous webs, a source of power; a first drive means controlled from said source of power for feeding said web at a substantially constant rate of speed; knife cutting means operating through a cycle, each cycle including a cutting interval during which the knife means engage and cut said web; a second variable speed drive means controlled from said source of power for driving said knife means; a third constant speed drive means having a portion thereof connected to said knife means and another portion to said source of power, said portions being operatively disconnected over a predetermined portion of the cycle and invariably engaging during the cutting interval of said knife cutting means for transmitting power from said source of power to said knife cutting means; spring means interposed between said second drive means and said source of power for permitting said knife means to be driven from said third drive means free from said second drive means; adjusting means interposed between said source of power and said second drive means for changing the rate of acceleration and deceleration of said second drive means; and means whereby said third drive means is disconnected from said source of power when said adjusting means is operated.

16. In a device for cutting sheets from continuous webs, a source of power; a first drive means controlled from said source of power for feeding said web at a substantially constant rate of speed; knife cutting means operating through a cycle, each cycle including a cutting interval during which the knife means engage and cut said web; a second variable speed drive means controlled from said source of power for driving said knife means; a third constant speed drive means comprising a cammed member driven from said source of power and a sector connected to said knife means periodically engaged at a. predetermined angular position of said cammed member for driving said knife means from said source of power; and adjusting means interposed between said source of power and said second drive means for changing the rate of acceleration and deceleration of said second drive means.

17. In a device for cutting sheets from continuous webs, a source of power; a first drive means controlled from said source of power for feeding said web at a substantially constant rate of speed; knife cutting means cooperating through a cycle, each cycle including a cutting interval during which the knife means engage and cut said web; a second variable speed drive means controlled from said source of power for driving said knife means; a third constant speed drive means comprising a cammed member driven from said source of power and a sector connected to said knife means periodically engaged at a predetermined angular position of said cammed member for driving said knife means from said source of power; adjusting means interposed between said source of power and said second drive means for changing the rate of acceleration and deceleration of said second drive means; and means whereby said third drive means is disconnected from said source of power when said adjusting means is operated.

18. In a device for cutting sheets from continuous webs moving at a predetermined speed, a source of power; knife cutting means; a first drive connection from said source of power to said knife cutting means; a second drive connection from said source of power to said knife cutting means; means included in said first drive connection for changing the speed of said knife cutting means during each cycle to alternately bring said knife cutting means to the speed of the continuous web during the cutting period and to bring it to the speed of said second drive connection; and means whereby when said knife cutting means is brought to the speed of said second drive connection, said source of power drives said knife cutting means over said second drive connection.

19. In a device for cutting sheets from continuous webs moving at a predetermined speed, a source of power; knife cutting means; a first drive connection from said source of power to said knife cutting means; a second drive connection from said source of power to said knife cutting means; means for driving said knife cutting means over said first drive connection and said second drive connection in sequence during each cycle of operation, said first drive connection varying the speed of said knife cutting means while it is effective to bring said knife cutting means to the speed of said continuous web and thereafter to restore it to the speed of said second drive connection; and means for thereafter during the remainder of the cycle driving said knife cutting means over said second drive connection.

20. In a device for cutting sheets from continuous webs moving at a predetermined speed, a source of power; knife cutting means; a first drive connection from said source of power to said knife cutting means; a second drive connection from said source of power to said knife cutting means; means for driving said knife cutting means over said first drive connection and said second drive connection in sequence during each cycle of operation, said first drive connection varying the speed of said knife cutting means while it is effective to bring said knife cutting means to the speed of said continuous web and thereafter to restore it to the speed of said second drive connection; and means for thereafter during the remainder of the cycle driving said knife cutting means over said second drive connection; said first drive connection being a positive drive and said second drive connection including a clutch mechanism.

21. In a device for cutting sheets from continuous webs moving at a predetermined speed, a source of power; knife cutting means; a first drive connection from said source of power to said knife cutting means; a second drive connection from said source of power to said knife cutting means; means for driving said knife cutting means over said first drive connection and said second drive connection in sequence during each cycle of operation, said first drive connection varying the speed of said knife cutting means while it is effective to bring said knife cutting means to the speed of said continuous web and thereafter to restore it to the speed of said second drive connection; means for thereafter during the remainder of the cycle driving said knife cutting means over said second drive connection; and means for changing the speed of the drive through said second drive connection for varying the size of material cut from said continuous web.

22. In a device for cutting sheets from continuous webs moving at a predetermined speed, a source of power; knife cutting means; a first drive connection from said source of power to said knife cutting means; a second drive connection from said source of power to said knife cutting means; means for driving said knife cutting means over said first drive connection and said second drive connection in sequence during each cycle of operation, said first drive connection varying the speed of said knife cutting means while it is effective to bring said knife cutting means to the speed of said continuous web and thereafter to restore it to the speed of said second drive connection; means for thereafter during the remainder of the cycle driving said knife cutting means over said second drive connection; said first drive connection being a positive drive and said second drive connection including a clutch mechanism; and means for changing the speed of the drive through said second drive connection for varying the size of material cut from said continuous web.

GUSTAVE A. UNGAR.